US006628737B1

(12) United States Patent
Timus (10) Patent No.: US 6,628,737 B1
(45) Date of Patent: Sep. 30, 2003

(54) SIGNAL SYNCHRONIZATION USING SYNCHRONIZATION PATTERN EXTRACTED FROM SIGNAL

(75) Inventor: Bogdan Timus, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/327,735

(22) Filed: Jun. 8, 1999

(30) Foreign Application Priority Data

Jun. 8, 1998 (SE) .............................................. 9802022

(51) Int. Cl.[7] .............................................. H04L 7/00
(52) U.S. Cl. ....................................... 375/368; 375/226
(58) Field of Search ................................ 375/219, 220, 375/224, 226, 227, 229, 230, 231, 232, 233, 262, 265, 130, 133, 134, 136, 137, 140, 141, 145, 147, 149, 341, 316, 354, 356, 365, 366, 368

(56) References Cited

U.S. PATENT DOCUMENTS

| 5,430,485 A | | 7/1995 | Lankford et al. |
| 6,047,004 A | * | 4/2000 | Koyama ..................... 370/509 |
| 6,134,233 A | * | 10/2000 | Kay ........................... 370/350 |

FOREIGN PATENT DOCUMENTS

| CA | 2148340 | 2/1996 |
| EP | 0 540 808 | 5/1993 |
| EP | 0 714 183 | 5/1996 |
| WO | 97/50201 | 12/1997 |

OTHER PUBLICATIONS

Tallak, et al., "Time Delay Estimation for Objective Quality Evaluation of Low Bit–Rate Coded Speech with Noisy Channel Conditions" IEEE, 1993, pp 1216–1219.

* cited by examiner

*Primary Examiner*—Chi Pham
*Assistant Examiner*—Pankaj Kumar (57) ABSTRACT

A signal quality measurement system includes a transmitter for transmitting a test signal to a receiver and a device for storing a copy of the test signal at the receiver. The similarity between the stored copy of the test signal and the signal received at the receiver is measured to determine reception quality. The receiver also includes a device for selecting a sequence of different synchronization patterns directly from the stored copy of the test signal, for determining, from said received signal, a sequence of signal segments that best matches the synchronization pattern sequence and for synchronizing the received signal with the signal segment sequence, thereby synchronizing the received signal with the stored copy of the test signal.

3 Claims, 7 Drawing Sheets

SIGNAL SYNCHRONIZATION USING SYNCHRONIZATION PATTERN EXTRACTED FROM SIGNAL

TECHNICAL FIELD

The present invention relates generally to signal quality measurement, and in particular to synchronization of a stored test signal with a received signal, the quality of which is to be measured.

BACKGROUND

In order to find weak spots of for example, a telephony system or a cellular radio communication system it is possible to transmit a known speech signal and to compare the received signal with a copy of the same signal. A problem that must be solved before the comparison may be performed is the synchronization of the samples of the stored copy with the samples of the received signal.

Citation [1] describes a transmission quality rating system, in which a test signal provided with a synchronization signal in the form of several chirp signals is repeatedly transmitted from a transmitter to a receiver. At the receiver the synchronization signal is used to find the beginning of the test signal. Thereafter the synchronization signal is discarded, and the actual test signal is used for quality rating. A drawback of this method is that the time occupied by the synchronization signal may not be used for rating, which makes the final rating less reliable. Another drawback of this prior art method is that if synchronization is lost during the test signal, for example due to a handover in a cellular radio communication system, re-synchronization is not possible until the test signal ends and a new chirp signal is transmitted, which may take as long as 20–30 seconds.

Citation [2] describes a signal synchronization method in a radio receiver, in which a dedicated synchronization sequence is combined with a known information carrying signal in order to reduce the synchronization time.

SUMMARY

An object of the present invention is a signal quality measurement method and system that are based on a synchronization method which allows quality measurement on the entire received signal.

Briefly, the present invention achieves this object by selecting synchronization patterns from the test signal itself, and by using these patterns for both synchronization and quality measurement.

Another object of the invention is a signal quality measurement method that includes a synchronization method which allows frequent re-synchronization.

A further object of the invention is a synchronization pattern selection method for selecting suitable synchronization patterns from a test signal.

Still another object of the invention is a synchronization position refinement method.

BRIEF DESCRIPTION OF THE DRAWINGS

The invention, together with further objects and advantages thereof, may best be understood by making reference to the following description taken together with the accompanying drawings, in which.

DETAILED DESCRIPTION

The present invention will be described with reference to a mobile radio communication system. However it will be appreciated that the same principles may be used in other types of "connections", for example in public switched telephone networks or in any situation where a possibly disturbed known test signal is to be compared to a copy of the original test signal.

Before the invention is described in detail, a short conceptual explanation of the inventive idea will be given with reference to FIGS. 1–3.

Figure 1:
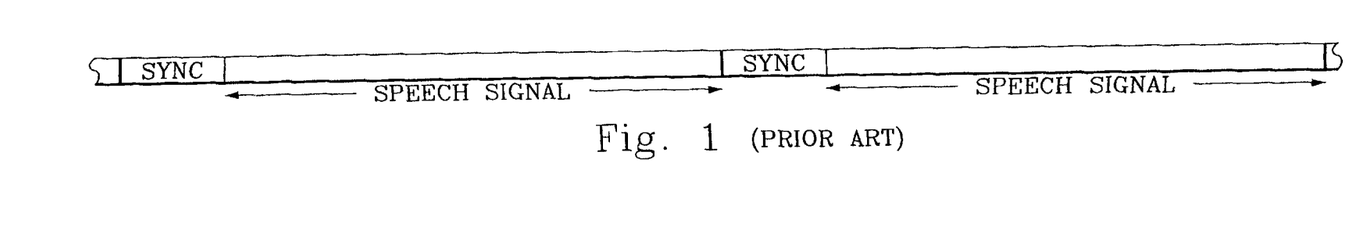
FIG. 1 is a time diagram illustrating characteristic features of a prior art signal synchronization method.

FIG. 1 is a time diagram illustrating characteristic features of a prior art signal synchronization method. A predetermined speech signal is repeatedly transmitted from a transmitter to a receiver. A copy of this speech signal is stored at the receiver. In order to synchronize the stored signal with the received signal, a dedicated synchronization signal SYNC, for example a chirp signal, is added to each transmitted speech signal. This implies that it is not possible to measure the received signal quality 100% of the time, since no measurements are performed during the time occupied by the synchronization signal. Furthermore, if synchronization is lost during reception of the test signal, for example due to a handover, re-synchronization may not be performed until the next chirp signal arrives, which may take as long as 20–30 seconds. This implies that quality measurements performed during this out of sync period will give misleading results, since the quality of the received signal may actually be good, but since it is out of sync with the stored test signal the quality measurement may indicate bad reception quality during this period.

Figure 2:
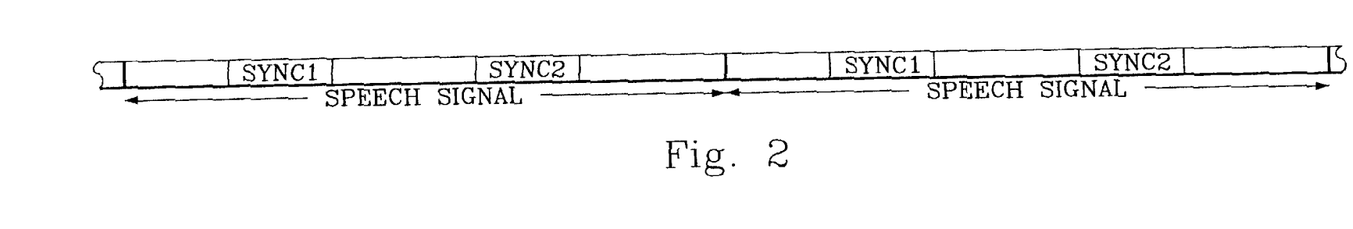
FIG. 2 is a time diagram illustrating characteristic features of an embodiment of a signal synchronization method in accordance with the present invention.

FIG. 2 is a time diagram illustrating characteristic features of an embodiment of a signal synchronization method in accordance with the present invention. In this case synchronization patterns SYNC1, SYNC2 are selected directly from the speech signal. Thus, the synchronization patterns SYNC1, SYNC2 are used both for synchronization and for quality measurement (since the are in fact speech signals).

Since the synchronization patterns SYNC1, SYNC2 are selected directly from the speech signal itself, an important feature of the present invention is a synchronization pattern selection method. Such a method will be described in detail with reference to FIGS. 4–5.

Furthermore, in FIG. 2 there are several synchronization patterns (SYNC1 and SYNC2 in the example) in every transmitted signal. This is a characteristic feature of the present invention. As will be described in detail with reference to FIGS. 6–8, the synchronization method of the present invention uses several synchronization patterns to determine the most likely synchronization position. The multiple synchronization patterns also reduce out of sync times due to, for example handover.

Figure 3:
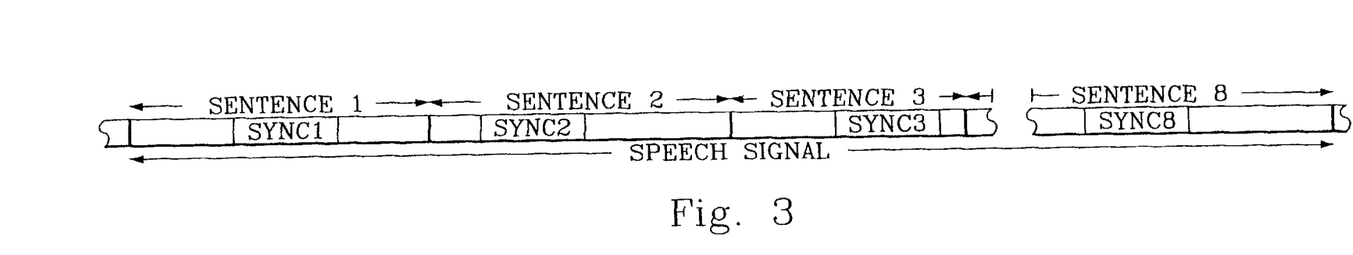
FIG. 3 is a time diagram illustrating characteristic features of another embodiment of a signal synchronization method in accordance with the present invention.

FIG. 3 is a time diagram illustrating characteristic features of another embodiment of a signal synchronization method in accordance with the present invention. This embodiment is typical for the environment in which the invention is used. In this embodiment the speech signal that is repeatedly transmitted, and of which a copy is stored in the receiver, is approximately 20–30 seconds long and comprises several pre-recorded sentences (8 in the example). Typically each sentence contains either a male, female or a child's voice. In the present embodiment there are 8 synchronization patterns in the speech signal, one from each sentence.

Figure 4:
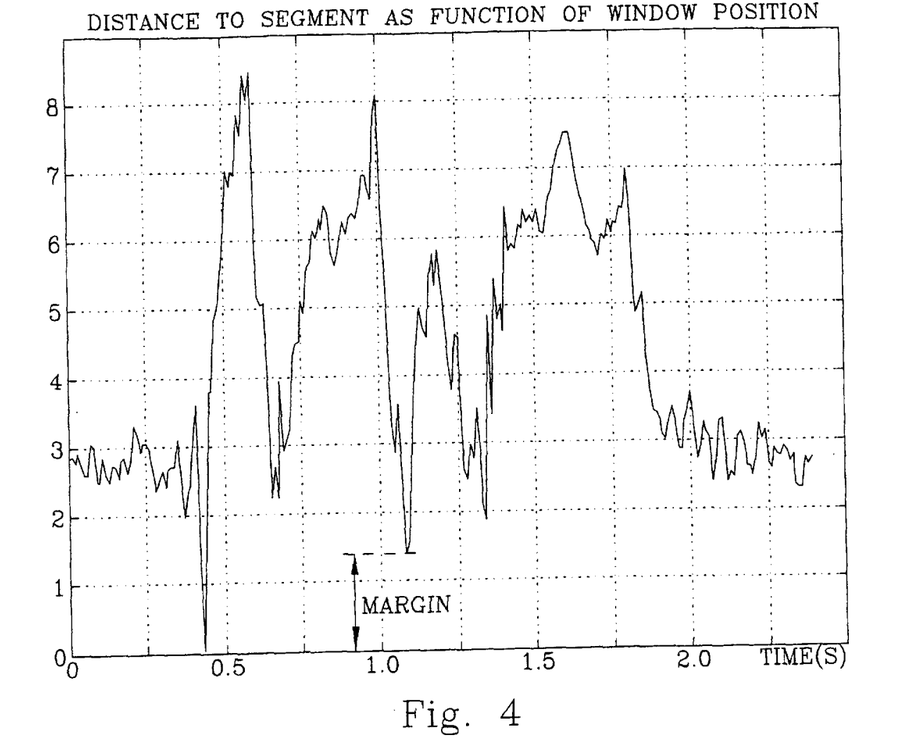
FIG. 4 is a time diagram illustrating an embodiment of the synchronization pattern selection method in accordance with the present invention.

FIG. 4 is a time diagram illustrating one of many possible embodiments of the synchronization pattern selection method in accordance with the present invention. In this example a separate synchronization pattern is selected from each sentence. First a synchronization pattern length is decided. Then a segment having this length is selected from the sentence. Thereafter a distance measure between the selected segment and every possible window (having the same length) of the sentence is determined. The curve in FIG. 4 illustrates the result of such calculations. This curve will have a minimum distance of zero in the position where the selected segment coincides with a corresponding window. As illustrated in FIG. 4 there will also be other windows of the sentence that have a short distance to (are similar to) the selected segment. These positions will show up as minima in the distance curve. The smallest of these minima is called the "margin" of the selected segment and represents an example of a pattern uniqueness measure that describes how well the selected segment distinguishes itself from the rest of the sentence. A segment should have a large margin in order to be suitable as a synchronization pattern (it should be easy to recognize the synchronization pattern and not confuse it with other parts of the sentence). As noted above the curve in FIG. 4 represents an example of a distance function for only one selected segment of predetermined length. The same type of curve is now produced for every possible segment selection (of the given length) of the sentence. Finally the most unique segment (the one having the largest margin in the example) is selected as the synchronization pattern of the sentence. This process is then repeated for the other sentences of the speech signal.

From the previous paragraph it is apparent that the type of distance measure that is used in the synchronization pattern search may influence the actual margins that are obtained, and therefore also the selection of the "best" pattern. The choice of distance measure will be discussed in detail with reference to FIGS. 9–10.

Figure 5:
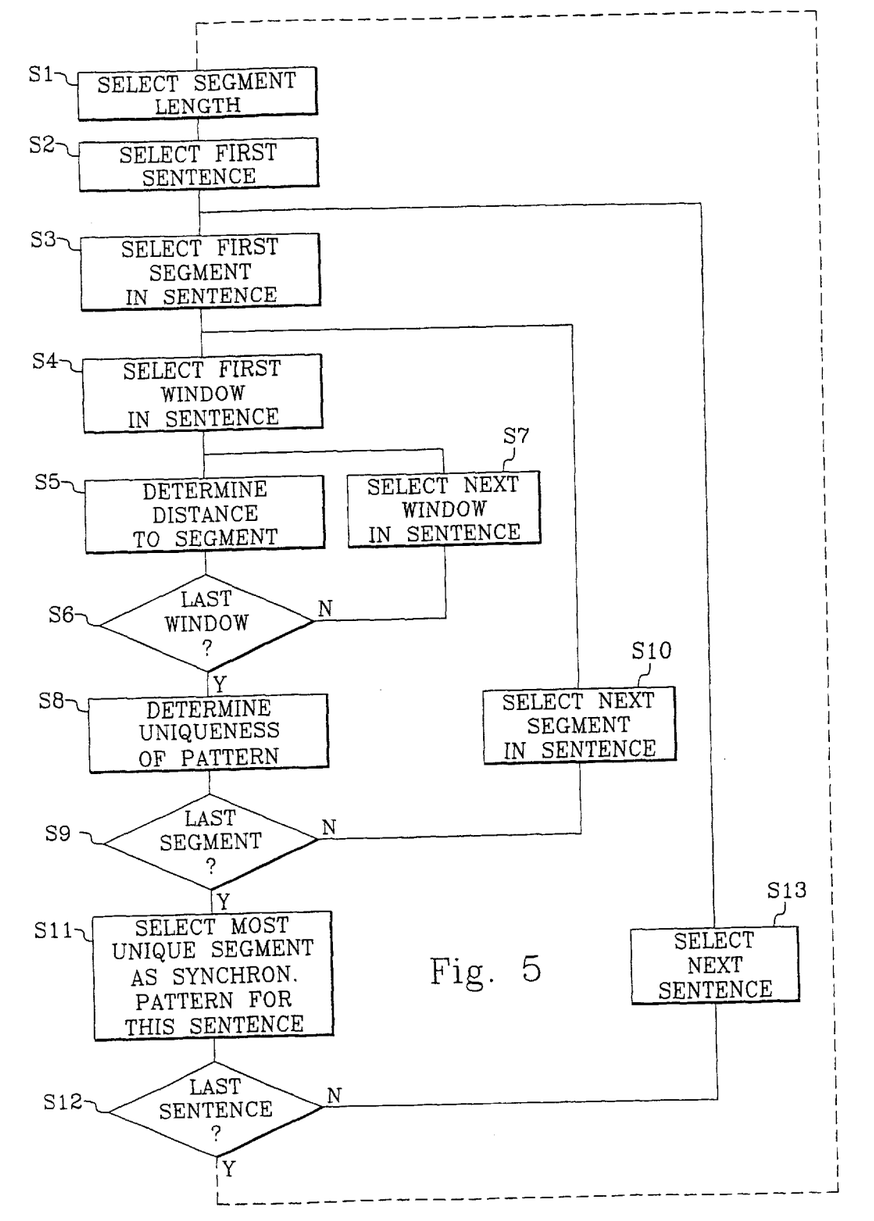
FIG. 5 is a flow chart illustrating the synchronization pattern selection method in accordance with the present invention.

FIG. 5 is a flow chart illustrating the synchronization pattern selection method in accordance with the present invention. In step S1 a segment length is selected. Step S2 selects the first sentence of the test signal. Step S3 selects the first segment of the given length in the selected sentence. In step S4 the first window in the given sentence is selected. Step S5 determines the distance between the segment and the current window. Step S6 tests whether the current window is the last window in the sentence. If this is not the case, step S7 selects the next window and returns the procedure to step S5. Otherwise the uniqueness of the segment is determined in step S8 by determining the margin from the measured distances. Step S9 tests whether the current segment is the last segment in the selected sentence. If this is not the case, the procedure selects the next segment in step S10 and returns to step S4. Otherwise step S11 determines which of the segments of the current sentence that has the largest margin, and selects this segment as the synchronization pattern of the sentence. Step S12 tests whether the current sentence is the last sentence of the test signal. If this is not the case, the procedure selects the next sentence in step S13 and returns to step S3. Otherwise a synchronization pattern has been selected for each sentence and the procedure ends. Optionally the procedure may return to step S1 (indicated by dashed line) and select another segment length and thereafter repeat the procedure with this new segment length. This option may be used if a margin is considered too small to sufficiently distinguish the corresponding pattern from the rest of its sentence.

The synchronization pattern selection method may seem rather complex, but it must be remembered that it is performed only once (typically on a computer) and off-line (not during actual transmission) during the design process of the quality measurement system. Once the synchronization patterns have been selected they are stored in the receiver. This may, for example, be done by storing a table of pointers to the beginning of the respective pattern in the stored test signal, the length of each pattern and the length of each sentence. This will implicitly give the positions of and distances (in samples) between the patterns in the test signal. Since the sentences are different the synchronization patterns will usually not have the same position in each sentence.

In the above description of FIGS. 4–5 the selected pattern uniqueness measure was the "margin". However, more sophisticated measures are also possible. One example is to combine the margin test with the requirement that the pattern also must exceed a certain energy threshold before it may be considered as a synchronization pattern. Such a supplementary requirement ensures that uncharacteristic segments, such as speech pauses (containing only background noise) are not selected as synchronization patterns. Without the supplementary energy requirement such segments would otherwise be likely synchronization pattern candidates, since noise is uncorrelated with the rest of the signal. However, background noise is unsuitable as a synchronization pattern, since it may be strongly disturbed (low SNR) or even replaced (DTX) during transmission. An alternative to requiring that the energy of the signal exceeds a certain threshold would be to require that the average of the "distance curve" exceeds a certain threshold. Another alternative supplementary test would be to test the width of the "opening" around the minimum.

Having described the synchronization pattern selection method, an example of an embodiment of the synchronization method in accordance with the present invention will now be described in detail with reference to FIGS. 6–8.

A basic step of this embodiment of the synchronization method of the present invention is to slide a window of the same length as the (equal length) synchronization patterns over the received signal, and to determine the distance between each pattern and the contents of the window in each window position. Assuming that there are 8 sentences in the recorded speech signal, and that 1 synchronization pattern has been selected for each sentence, each window position will therefore give 8 distance values. If the window matches one of the synchronization positions, one of the 8 distances would ideally be zero, but since the received signal may have been disturbed during transmission, the actual minimum value may be greater than zero. For this reason the different distance measures are compared to a small threshold. If a distance measure falls below the threshold the window may be in one of the synchronization pattern positions.

Figure 6:
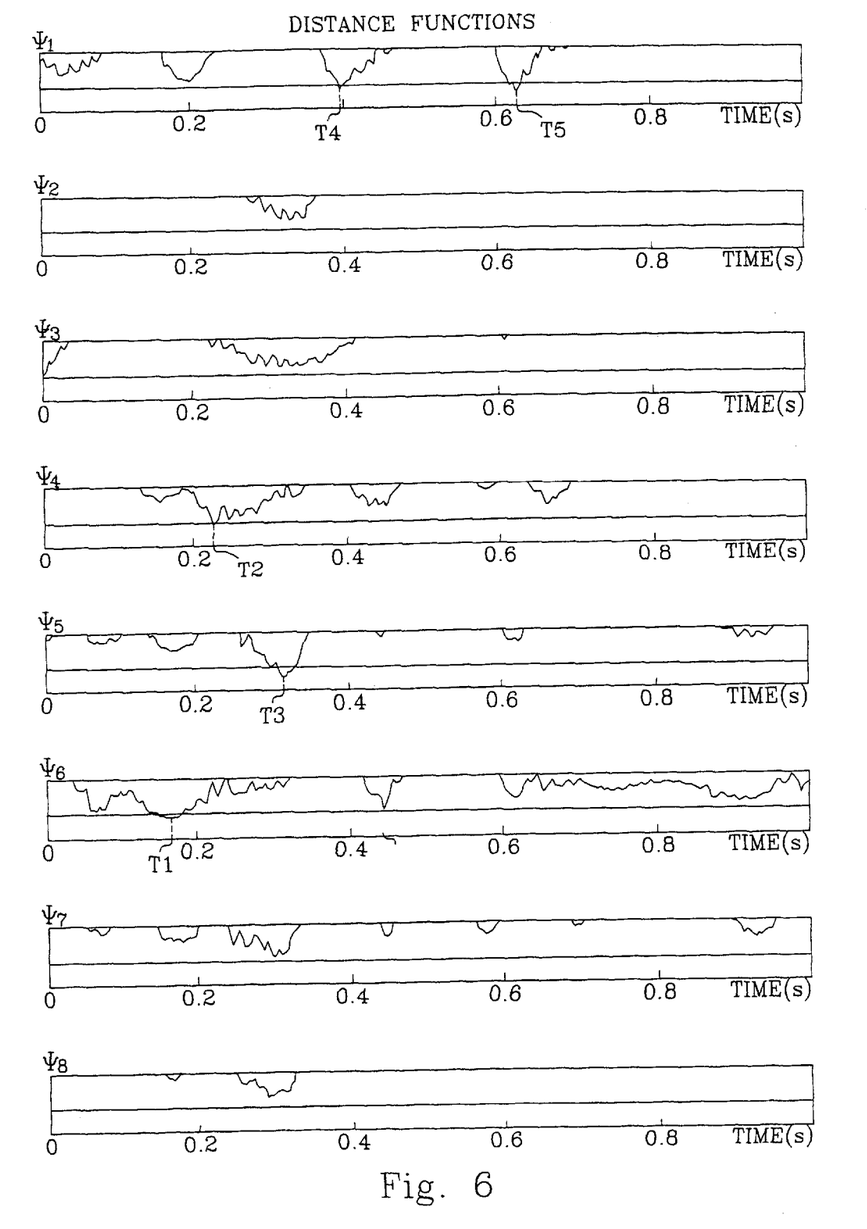
FIG. 6 is a time diagram illustrating 8 distance functions for 8 different synchronization patterns.

FIG. 6 is a time diagram illustrating 8 distance functions, $\psi_1$–$\psi_8$, for the 8 different synchronization patterns. The figure shows different minima below the solid threshold lines at instances T1–T5 (in the figure the threshold is set to 2). These minima all represent potential synchronization positions in the different sentences that correspond to these 8 curves. For example, the first minimum at T1 indicates a possible match with the synchronization pattern in sentence 6, whereas the second minimum at T2 indicates a possible match with the synchronization pattern in sentence 4. However, both possibilities can not be simultaneously valid, since the time between T1 and T2 is only about 0.05 seconds, which is much less than the typical length of a sentence (2–2.5 seconds) and each sentence only contains one synchronization pattern.

In order to resolve the above conflict, each minimum below the threshold line is associated with a hypothesis, namely that it corresponds to a match with a synchronization pattern in the corresponding sentence. However, such a hypothesis can be tested, since other matches in the following sentences must follow an actual match in one sentence. Thus, by tracking each hypothesis, the most likely hypothesis may be selected when the distance values at expected matches in the following sentences have been determined. To illustrate the procedure the following example table is used:

| Possible match in sentence number | Distance at possible match | Distance at expected match in next expected sentence | Distance at expected match in next expected sentence | Mean distance |
|---|---|---|---|---|
| 6 | 1.719 (at T1) | 5.153 | 7.453 | 4.77 |
| 4 | 1.837 (at T2) | 0.553 | 0.383 | 0.92 |
| 5 | 1.123 (at T3) | 5.556 | 5.347 | 4.00 |
| 1 | 1.679 (at T4) | 9.963 | 3.607 | 5.08 |
| 1 | 1.244 (at T5) | 7.076 | 6.679 | 5.00 |

This table will be used to illustrate a trellis-like synchronization procedure. The first column in this table lists the sentences in FIG. 6 where potential matches have been found. Column 2 lists the corresponding distance values (as measured with a distance measure that will be described with reference to FIGS. 9–10). Each such instance produces a hypothesis that a true match has been found. Thus, the first hypothesis will be that there is a match at T1 in sentence 6. This hypothesis is tested by measuring the distance (similarity) between the synchronization pattern of the next expected sentence (sentence 7) and the actual signal at the position where that pattern is expected. A small distance supports the hypothesis, whereas a large distance makes the hypothesis less likely. Column 3 in the table contains the distance values for the expected matches of the expected next sentences for each hypothesis (row). Since all values in column 3 except the second exceed the threshold (which is 2), hypothesis 2 (row 2) seems to be the most likely one.

This hypothesis is further strengthened by column 4, which lists the measured distances at the next expected match for each hypothesis. Column 5 contains the mean values of the three distance values for each hypothesis. Clearly hypothesis 2 has the smallest mean distance value, and therefore this hypothesis will be selected as the most likely one. Since hypothesis 2 corresponds to a detected match in sentence 4 and confirmed matches in sentences 5 and 6, the next sentence to be received will be sentence 7. Since the length of each sentence and the position of each synchronization pattern in its respective sentence are known, the beginning of sentence 7 may be calculated, and sentence 7 of the stored test signal may therefore be synchronized with sentence 7 of the received signal. Another alternative is to synchronize on the last sentence in the winning hypothesis (sentence 6 in this case), Still another possibility is to synchronize on the sentence that actually triggered the winning hypothesis (sentence 4 in this case).

In FIG. 6 the thresholds were constant. The threshold may, for example, be determined by the expected disturbance level. In this way it is possible to control the number of detected minima so that true minima are not missed and so that the number of detected minima is not too large to overload the system. However, it is also possible to have dynamic thresholds that are controlled by, for example, the estimated disturbance level. Another possibility is to measure the average number of detected minima per time unit, and to lower the threshold if this number is too high or raise the threshold if this number is too low. Furthermore, it is also possible to have different thresholds for different synchronization patterns, since the "uniqueness" of the patterns may be different.

Instead of adapting the thresholds to the prevailing disturbance level, it is also possible to hold the thresholds constant and determine and store several synchronization patterns of different length for each sentence. For low disturbance levels the shorter patterns may be used, while the longer patterns are used for higher disturbance levels to increase the reliability of the synchronization. Still another alternative is to determine and store several synchronization patterns for each sentence. As the disturbance level increases, the number of synchronization patterns that are used in the synchronization procedure may also be increased, thereby increasing the reliability of the synchronization. Combinations of these adaptation methods are also possible.

Figure 7:
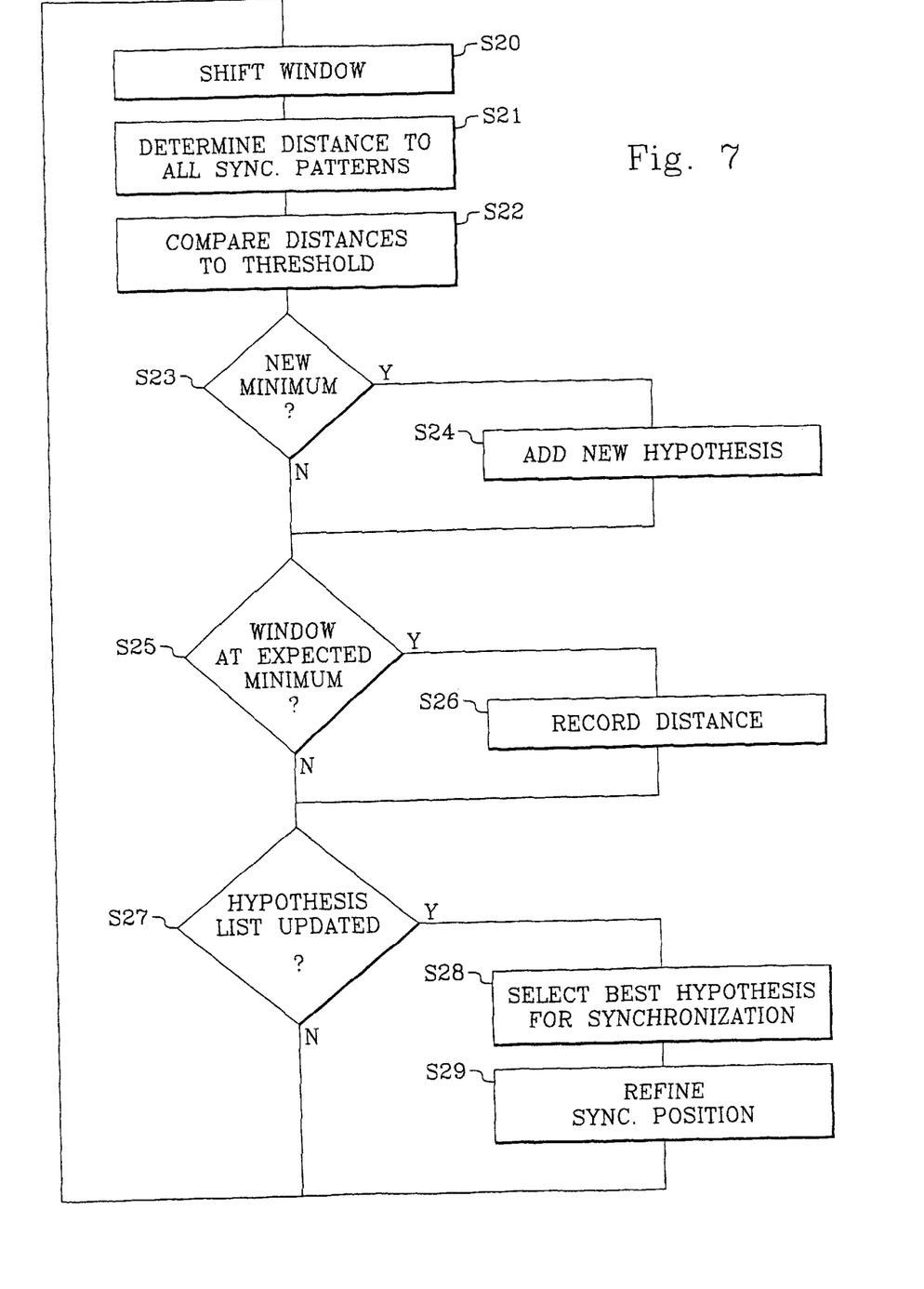
FIG. 7 is a flow chart illustrating the signal synchronization method in accordance with the present invention.

FIG. 7 is a flow chart illustrating the signal synchronization method in accordance with the present invention. In step S20 the inspection window is shifted to a new position in the received signal. In step S21 the part of the received signal that is within this window is compared to each synchronization pattern by determining a distance measure for each pattern. In step S22 each distance measure is compared to a threshold. Step S23 tests whether a measure was below the threshold. If not, the routine proceeds to step S25. Otherwise step S24 adds another hypothesis to a hypothesis list. This step corresponds to filling a new row in the above table with values in columns 1 and 2. Thereafter the routine proceeds to step S25. Step S25 tests whether the window is in a position that is expected to correspond to a match according to a hypothesis in the list. If not, the routine proceeds to step S27. Otherwise step S26 records the distance between the contents of the window and the expected matching pattern in the hypothesis list. This step corresponds to filling columns 3 and 4 in the above table. Thereafter the routine proceeds to step S27. Step S27 tests whether the hypothesis list has been updated by a new hypothesis or a hypothesis test. In the example given above with reference to the table, the hypothesis list is considered updated when a hypothesis contains 3 consecutive distance measurements (values in columns 2–4 of the same row). Other embodiments, in which 2 or more than 3 measurements are required, are of course also possible. If the hypothesis list has not been updated, the routine returns to step S20. Otherwise step S28 selects (this is the above mentioned hypothesis test) the best hypothesis for synchronization by computing the mean distance for the new hypothesis and comparing it to the other mean distances in column 5 of the above table. The row having the smallest mean distance is selected as the current synchronization hypothesis, and this is the only hypothesis that is retained in the hypothesis list (this step is the actual update of the hypothesis list). Step S29 is an optional synchronization position refinement step, which will be described in detail with reference to FIGS. 9–10. Finally the routine returns to step S20.

Figure 8:
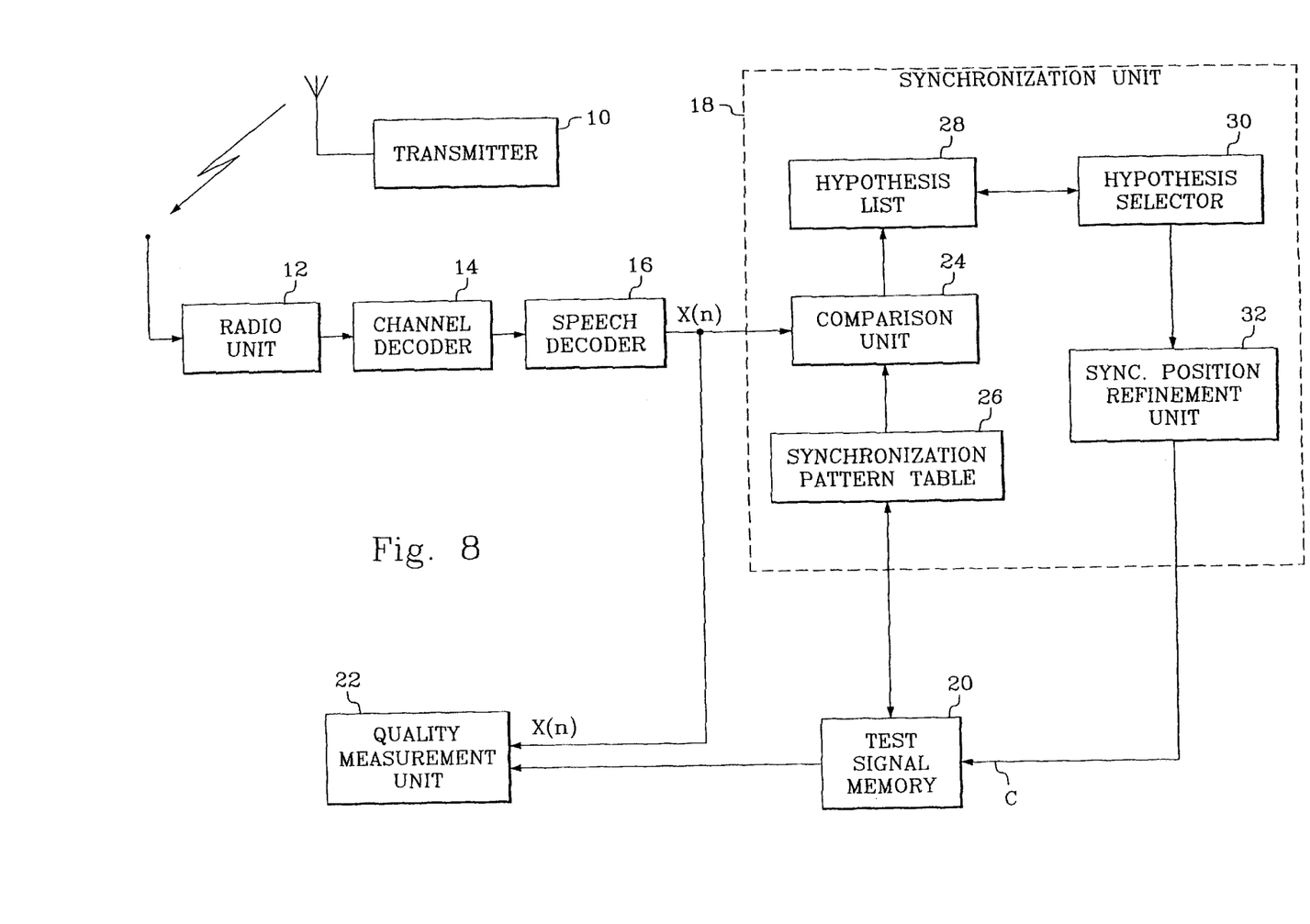
FIG. 8 is a block diagram illustrating the signal synchronization apparatus in accordance with the present invention.

FIG. 8 is a block diagram illustrating an embodiment of a signal synchronization system in accordance with the present invention. A transmitter 10 repeatedly transmits the test signal. The received signal is demodulated in a radio unit 12, channel decoded in a channel decoder 14 and speech decoded in a speech decoder 16 into a stream of speech samples X(n). These speech samples are forwarded to a synchronization unit 18, which controls the output of the stored copy of the test signal from a memory 20 with a control signal C. The similarity between test signal from memory 20 and the received speech samples X(n), which are now synchronized with each other, is measured in a quality measurement unit 22.

Synchronization unit 18 comprises a comparison unit 24, which compares the current window to each synchronization pattern. The synchronization patterns are obtained from a synchronization pattern table, which retrieves the patterns from test signal memory 20. Comparison unit 24 updates a hypothesis list 28 as new potential matches are detected and also provides the hypothesis list with the distance measures of predicted matches. The history list is forwarded to a hypothesis selector 30, which selects the most probable hypothesis for synchronization. Hypothesis selector 30 also deletes each discarded hypothesis from hypothesis list 28. The selected synchronization position may be further refined in a synchronization position refinement unit 32, which will be described with reference to FIGS. 9–10. Typically the functionality of synchronization unit 18 is implemented by a micro/signal processor combination.

An advantage of the described synchronization method, besides the fact that the entire test signal is available for quality measurements, is that the method allows frequent re-synchronization. In the given example, when a handover occurs and the timing of the received signal is changed, re-synchronization is established after only 3 sentences. Another advantage is that the synchronization is automatically updated on a sentence by sentence basis.

As has been noted above the measurement of distance between synchronization patterns and windows is a critical step in the synchronization method of the present invention. One requirement on the distance measurement method is that the synchronization precision must be found with high precision (sample level). Another requirement is that the computational complexity of the method should not be to high, since the measurements must be performed in real time. There are good high precision methods, but they are usually too complex for realization in real time. In order to solve this conflict the present invention suggests a multi-step refinement procedure, in which a low complexity method is used in the synchronization method described with reference to FIGS. 6–8 to find an approximate synchronization position, which is further refined by more complex methods.

Figure 9:
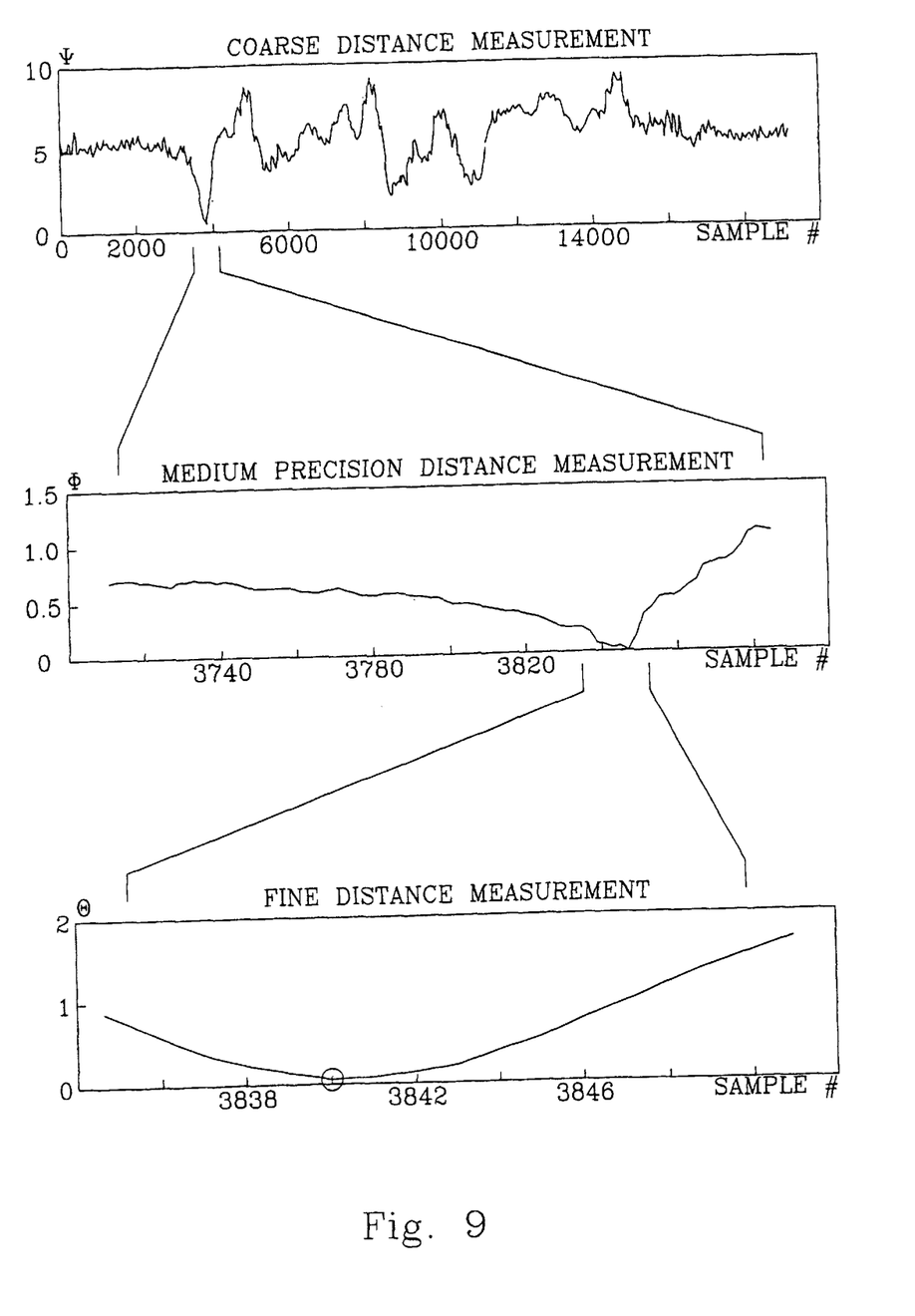
FIG. 9 is a time diagram illustrating the synchronization position refinement method in accordance with the present invention.

FIG. 9 is a time diagram illustrating the synchronization position refinement method in accordance with the present invention. In this embodiment each synchronization pattern consists of 800 samples (which corresponds to 0.1 seconds of speech at a sampling rate of 8000 Hz). The first, coarse synchronization step, which is illustrated at the top of FIG. 9 (comparison curve ψ, which corresponds to one of the curves in FIG. 6), determines the synchronization position with an accuracy of the order of 200 samples (with a method described in detail below). The second step, which is illustrated in the middle of FIG. 9 (comparison curve φ, refines this accuracy to about 20 samples (with a method described in detail below), while the third step, which is illustrated in detail at the bottom of FIG. 9 (comparison curve Θ), refines this accuracy down to sample level (with a method described in detail below).

In the illustrated embodiment of the coarse synchronization position measurement the synchronization pattern is divided into 5 pieces, each consisting of 160 samples. Thereafter each piece is modeled by a short-term predictor filter, and the reflection coefficients of the filter are used as model parameters. In the illustrated embodiment 4 reflection coefficients are calculated for each piece of 160 samples. These 4*5=20 parameters now represent the entire synchronization pattern. These calculations are performed off-line during the synchronization pattern determination process described above and the obtained reflection coefficients are stored in the receiver. The sliding window in which the received signal is presented uses a sliding step of the same length as the above-described pieces, 160 samples in the example. The signal samples in the current sliding window (800 samples) are also divided into 5 pieces that are modeled by reflection coefficients in the same way as the synchronization signals. Thus, the current sliding window will represent the 800 samples of the signal by 5*4=20 reflection coefficients. This implies that when the window is shifted the 4 reflection coefficients of the next piece will be calculated and the last 4 reflection coefficients will be discarded. When the distance between the current sliding window is calculated, this distance is calculated in the "reflection coefficient domain" instead of the "sample domain". Typically the distance measure is based on the ordinary Euclidean distance (the sum of the squares of the differences between corresponding reflection coefficients of the window and the synchronization pattern).

The number of pieces and the number of reflection coefficients modeling each piece depends on the length of the synchronization patterns, the accuracy of the model of each piece and the computation complexity that can be accepted.

The described coarse synchronization position determining method is in fact based on the spectral envelope difference between the received signal and the synchronization patterns. The comparison curve ψ in FIG. 9 therefore has a desirable slow variation, of the same order as the piece length (160 samples in the example). This is also the reason why a sliding window shifting step of the same length is suitable. Since the number of operations required to calculate the reflection coefficients is proportional to the piece length and an evaluation is performed only once for each piece length, it follows that the number of operations required to generate the comparison curve ψ is proportional to the number of samples.

The choice of reflection coefficients as a suitable "domain" has several advantages. One advantage is the wide opening of the minimum of the comparison curve ψ due to the slow variation of the distance measure. This leads to well separated minima. Another advantage is that these parameters can be expected to be resistant to transmission errors (the same type of parameters are used for speech encoding/decoding in mobile radio communication systems). This implies that although the synchronization may be imprecise it has a high probability of being correct. Furthermore, the simplicity of the distance measurement makes it suitable for the rather complex trellis-based synchronization method described above. The described distance measure may be used in the synchronization pattern selection method described with reference to FIGS. 4–5. Other possible distance measures may be based on, for example, LAR parameters (a variation of reflection coefficients) or cepstrum.

The next step in the synchronization position refinement method examines only the neighborhood of the initial estimate (an interval of 200 samples around the estimate). Since fewer positions have to be checked, a more complex method may be used. A suitable measure is a distance measure in the spectral domain. Examples are given in Citation [3]. A presently preferred method is a segmental spectral SNR measure defined by equation (5) in Citation [3]. In this step the sliding window will still be 800 samples wide as in the first step, but by using a step length of 20 samples only 10 positions have to be calculated. This second step refines the precision of the estimate to about 20 samples. At this accuracy level this method gives a desirable wide opening at the minimum of curve φ in FIG. 9.

The final step is the most complex and accurate method. A suitable method is a correlation based (time or sample domain) method that finds the correlation between the synchronization pattern and the sliding windows in 20 sample positions around the estimate from step 2. This brings the accuracy of the estimate down to sample level. At this accuracy level this method gives a desirable wide opening at the minimum of curve Θ in FIG. 9.

Figure 10:
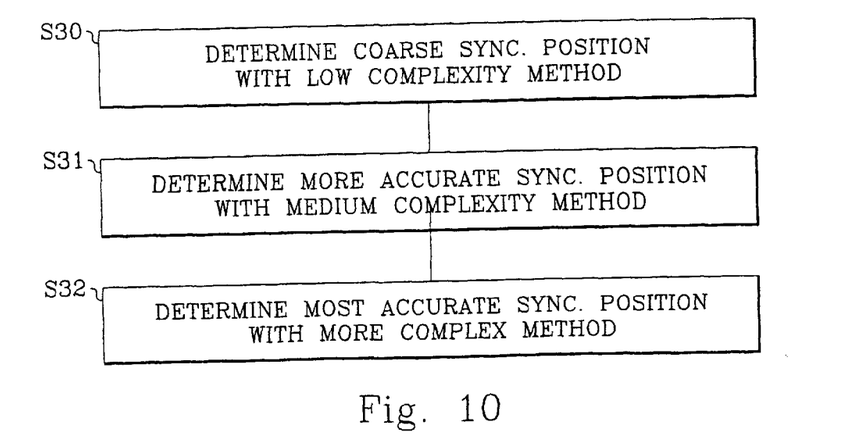
FIG. 10 is a flow chart illustrating the synchronization position refinement method in accordance with the present invention.

FIG. 10 is a flow chart that summarizes the synchronization position refinement method in accordance with the present invention. In step S30 a coarse synchronization position is determined by a low complexity method, for example the above described reflection coefficient based method. This method is used in the computationally intense synchronization method described with reference to FIG. 7. The coarse method finds the correct sentence and an approximate synchronization position within that sentence. The coarse synchronization position is refined in step S31 with a method of intermediate complexity, for example the above-described segmental spectral SNR based method. Finally the synchronization position is refined down to sample level in step S32 with a more complex method, for example the described correlation method. Typically the three steps are realized by a micro/signal processor combination.

As demonstrated by the above description of the synchronization position refinement method, the distance measurement may be based on different domains and on different distance measures in each domain. This implies that a synchronization pattern selection method based on, for example, the reflection coefficient domain and the Euclidean distance may not give the same synchronization pattern as a selection method based on the sample (time) domain and correlation. This feature is recognized in a more sophisticated embodiment of the synchronization pattern selection method, in which individual synchronization patterns are selected and stored for each domain and distance measure. In this way each refinement step is associated with the most "unique" synchronization pattern for that step (according to the domain and distance measure used in the step).

Sometimes the the received signal is attenuated as compared to the stored reference signal. Some measures are insensitive to different signal levels between received signal and reference signal, while other measures are sensitive to such level differences. For example, distance measures based on reflection coefficients are insensitive to changes in signal amplitude, while measures based on spectral distance are sensitive to such changes. In such cases, the energy of the reference sentence can, after coarse synchronization based on a level insensitive distance measure, be computed and compared to the energy of the first received sentence. The obtained ratio may then be used as a scaling factor for the received signal. Even if the coarse synchronization is not perfect, the influence of the synchronization error of up to 100 samples does not significantly affect the scaling factor (the sentences typically have 20,000 samples).

In the above description the present invention has been described with reference to speech signals. However, it is appreciated that the test signal may also contain other types of audio signals, for example music. In fact, the same principles may also be used for other signals than audio signals, such as video signals.

It will be understood by those skilled in the art that various modifications and changes may be made to the present invention without departure from the spirit and scope thereof, which is defined by the appended claims.

CITATIONS

1. Canadian patent application 2 148 340 (Ascom Infrasys AG)
2. EP 0 714 183 A2 (Becker Gmbh)
3. S. Tallak et al, "Time Delay Estimation for Objective Quality Evaluation of Low Bit-Rate Coded Speech with Noisy Channel Conditions", IEEE, 1993, pp 1216–1219

What is claimed is:

1. A signal quality measurement method including the steps of:

sending a test signature from sending end to a receiving end of a connection;

storing a copy of said test signal at said receiving end;

measuring the similarity between said stored copy of said test signal and the signal received at said receiving end;

selecting a sequence of different synchronization patterns directly from said stored copy of said test signal;

determining, from said received signal, a sequence of signal segments that best matches said synchronization pattern sequence, wherein said determining step is a trellis based procedure that finds the sequence of signal segments that has the greatest probability of matching said synchronization pattern sequence;

synchronizing said received signal with said signal segment sequence, thereby synchronizing said received signal with said stored copy of said test signal;

comparing each synchronization pattern to a set of partially overlapping segments of the signal received by said receiver to determine where in said received signal each synchronization pattern is most likely found, wherein said comparing step includes comparing, for each synchronization pattern and segment, a distance measure representing the similarity between synchronization pattern and segment to a threshold and further marking a segment as a possible synchronization position for the corresponding synchronization pattern if said distance measure fails below said threshold;

including an individual threshold for each synchronization pattern;

dynamically updating each threshold in accordance with a prevailing disturbance level; and selecting another sequence of synchronization patterns, in which each synchronization pattern has another length, if a prevailing disturbance level changes a predetermined amount.

2. A method of selecting a synchronization pattern from a predetermined signal, including the steps of selecting a synchronization pattern length;

selecting possible segments having said synchronization pattern length from said predetermined signal;

sliding a window having said synchronization pattern length over said predetermined signal;

determining, for each segment, a collection of distance measures representing the distance between the segment that corresponds to the collection and the contents of said predetermined signal in all possible sliding window positions; and selecting, as synchronization pattern, the segment that corresponds to the collection the maximizes a predetermined segment uniqueness measure.

3. The method of claim 2, further including the steps of forming a distance measure set containing the smallest strictly positive distance measure from each collection;

selecting the largest distance measure from said distance measure set; and selecting, as synchronization pattern, the segment that corresponds to said selected largest distance measure.

* * * * *